Nov. 8, 1966 G. B. LUCAS 3,284,244
MULTIPLE VENT PLUG ASSEMBLY
Filed Oct. 4, 1965 2 Sheets-Sheet 1
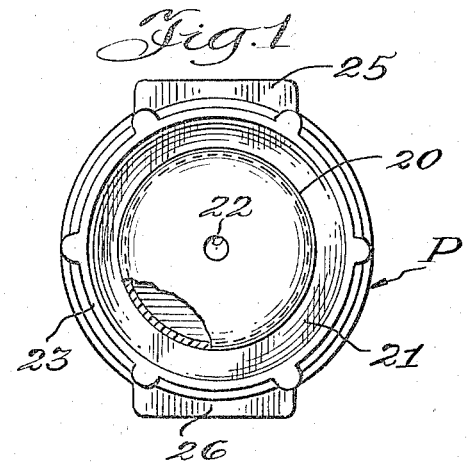
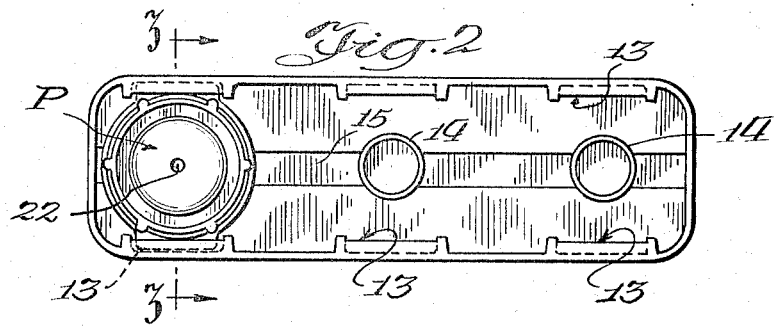
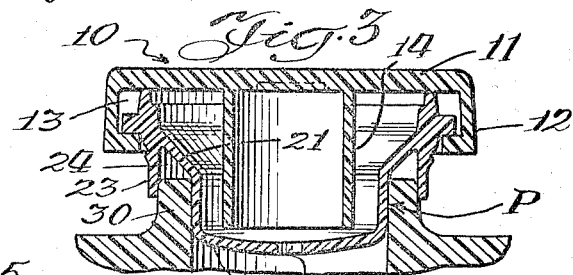
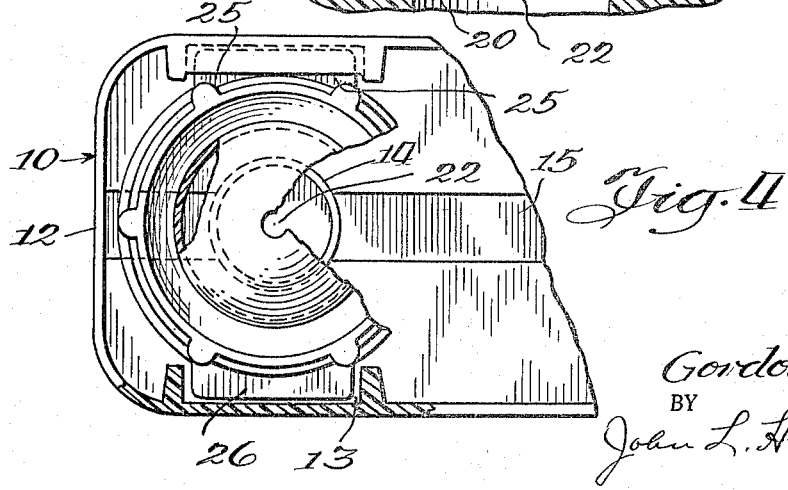
INVENTOR.
Gordon B. Lucas
BY
John L. Hutchinson
Attorney

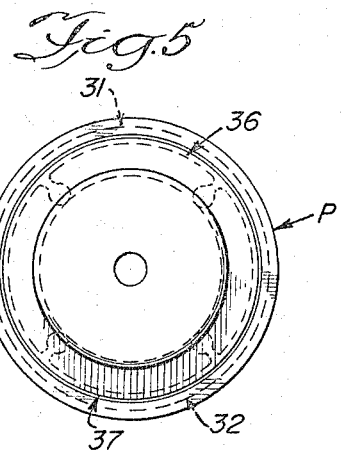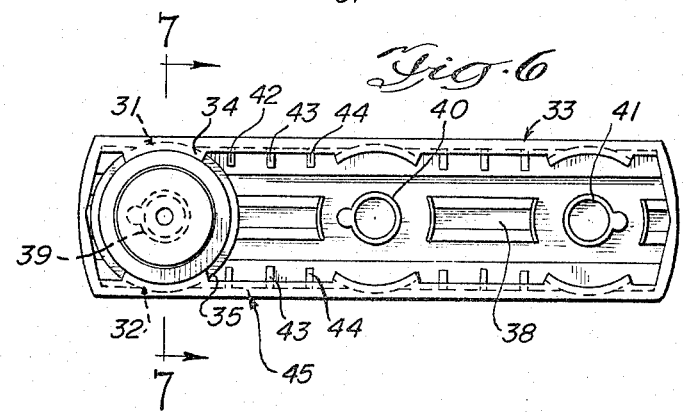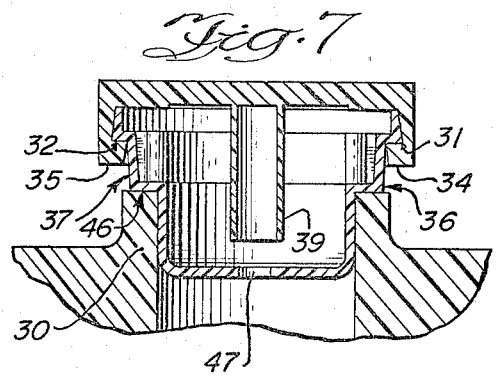

United States Patent Office 3,284,244
Patented Nov. 8, 1966

3,284,244
MULTIPLE VENT PLUG ASSEMBLY
Gordon B. Lucas, River Forest, Ill., assignor to The Richardson Company, Melrose Park, Ill., a corporation of Ohio
Filed Oct. 4, 1965, Ser. No. 492,731
7 Claims. (Cl. 136—177)

This is a continuation-in-part of my application Serial No. 314,268 filed October 7, 1963, and now abandoned.

The present invention is concerned with vent plugs of the type normally employed for closing filling wells of electrical storage batteries. More particularly, the present invention is directed to a new and improved vent plug assembly adapted to close a plurality of battery filling wells.

The usual electrical storage battery, particularly of the automotive type, is contained in a multiple compartment case, each compartment comprising a separate cell. Each of the cells is composed of electrolyte, lead plates and associated connecting elements. The cells are normally connected in series to provide the desired voltage.

In general, two types of covers are provided for such batteries. One type consists of an individual cover for each cell; whereas, the other type is commonly referred to as a "one-piece" cover and extends over all cells. Normally the covers include an opening for each cell, commonly referred to as a "filling well," whose purpose is to afford access to the cell to permit the addition of electrolyte or distilled water. Each such filling well is provided with a stopper or plug to prevent discharge of electrolyte from the cell. Due to the chemical reactions occurring, gases are continually evolved from the cells, and provision must be made for egress of the gases from the cells. Accordingly, each filling well stopper or plug is provided with appropriate venting means whereby the gases generated are permitted to pass from the cell through the plug to the atmosphere. It is frequently the practice to make the plug hollow and incorporate baffles within the plug. The baffles, while permitting the egress of gases from the cell through the plug, serve to appreciably obstruct any inadvertent passage of electrolyte through the plug.

In order to serve a battery, the individual vent plugs must be removed from the filling wells to permit addition of the aforementioned electrolyte or distilled water. With the usual battery containing individual vent plugs, it is necessary to remove and replace each vent plug separately. This is a somewhat tedious operation, particularly with the new twelve volt batteries having six cells. In addition, vent plugs when removed may be misplaced or dropped, resulting in further delay or difficulty for an attendant servicing a battery.

In my co-pending application Serial No. 245,815, filed December 19, 1962, I have disclosed and claimed a multiple vent plug assembly. This assembly, in brief, consists of an elongated body from which is suspended a plurality of vent plugs, generally three. Such an assembly permits the installation and removal of a plurality of vent plugs simultaneously and eliminates certain of the disadvantages referred to above.

The present invention comprises an improvement on the invention disclosed and claimed in my aforementioned application. In particular, the present invention constitutes an improvement over my prior multiple vent plug assembly in that the present article is composed of less components, while affording the same advantages and, therefore, enables a multiple vent plug to be manufactured at a further reduction in cost.

In the drawings:

FIGURE 1 is a plan view of the underside of a plug comprising one component of the multiple vent plug assembly.

FIGURE 2 is a plan view of the underside of the multiple vent plug assembly showing one plug installed in the base or elongated body.

FIGURE 3 is an enlarged cross-sectional view taken on line 3—3 of FIGURE 2.

FIGURE 4 is an enlarged plan view, partly in section, of a portion of the underside of the multiple vent plug assembly further illustrating the relationship of the parts of the assembly.

FIGURE 5 is a plan view of the underside of a modified plug.

FIGURE 6 is a plan view of the underside of a modified vent plug assembly showing one plug of FIGURE 5, installed in the base or elongated body.

FIGURE 7 is an enlarged cross-sectional view taken on line 7—7 of FIGURE 6.

Turning now to FIGURES 1–4, the numeral 10 indicates generally a one-piece elongated body or base. The body 10 is provided with a peripheral depending skirt 12. Extending inwardly from the inside of the skirt 12 are a plurality of projections which are so disposed as to form recesses 13. It will be noted that the opposite inner sides of skirt 12 are provided with opposing recesses 13 at the underside of body 10. As shown in FIGURE 2 there are three pairs of opposing recesses. However, any number of pairs of opposing recesses may be provided for the purpose hereinafter described.

Centrally disposed between each pair of opposing recesses 13 and depending from the underside of body 10 is a cylindrical baffle 14. Extending between the cylindrical baffles is a longitudinal recess 15 formed in the underside of body 10.

Each opposing pair of recesses 13 is adapted to support a vent plug P in the manner described hereinbelow. The plug P is normally circular in design and consists of a main cup-like body 20 having a part of its uppersides outwardly flared as at 21. The bottom of the cup-like body 20 is provided with a small vent opening 22. Depending downwardly from the outside surface of the flared section of body 20 is a cylindrical skirt 23 which envelopes the main plug body forming a concentric cylindrical recess 24. As indicated in FIGURE 3 recess 24 is adapted to receive and nestle under a friction fit the upwardly projecting edge or periphery 30 of a filling well.

Each plug P is additionally provided with laterally extending lugs. These may be in the form of rectangular shapes 25 and 26, as shown in FIGURE 1, or in the form of flanged sections 31 and 32, as shown in FIGURE 5. The lugs are positioned near the upper periphery of the plug.

In assembling the plugs P to the body 10 in FIGURE 3, one of the laterally extended lugs is initially inserted into one of the recesses 13 and then by slight pressure on the plug in the vicinity of the other lug, and simultaneous slight outward deformation of that portion of the skirt 12 having the opposing recess, the other lug is forced or snapped into the opposing recess. While the relationship and design of the parts of the assembly and the contemplated plastic materials from which the parts are made are such as to permit the parts to be assembled as described, these same features likewise serve to hold the parts in substantially a permanent relationship once the parts are assembled. The number of plugs which may be installed or assembled to the supporting body 10 can vary, but generally it has been found that three such plugs provide the most practical and workable assembly.

When the plugs P have been assembled to the body 10, the body may be then placed over three adjacent filling well openings and the openings closed by pressing the body down, thereby forcing the plugs into the filling well openings. The spacing between plugs when attached to the supporting body should be substantially the same as the spacing between the filling wells of adjacent cells. In view of variations in manufacture of covers containing filling wells and assembly of covers into cells, it can also be appreciated that some flexibility is necessary as, a practical matter, when employing a multiple vent plug of the type described herein. Accordingly, the lugs 25 and 26 and recesses 13 are formed with such dimensions that, when the lugs are installed in the appropriate recesses of the body 10, some limited play or movement of the lugs is permitted within the recesses enabling corresponding relative movement of the plugs with respect to the body 10, both laterally and longitudinally, but particularly the latter. This flexibility or movement of the lugs in the recesses permitting relative movement of the vent plugs with respect to the supporting body enables adjustment of the respective plug positions to compensate for variations in location of filling wells.

When the multiple plug has been installed in a battery, each individual plug is so designed as to permit it to serve in the same manner as is customary with an individual plug. For example, gases formed in a cell are permitted to pass upward through opening 22 of the plug P. Such gases then pass around baffle 14 and may be discharged to the atmosphere by means of recess 15, which, as shown, provides an exit from within the plug by extending over its edge. In the event that electrolyte from the cell should inadvertently be discharged up into the hollow interior of the plug P, obstruction to its further passage from the plug will be provided by means of the baffle 14. Due to the fact that the bottom of the body 20 of the vent plug is normally designed so as to taper slightly toward opening 22, any electrolyte which may find its way into the plug will eventually flow back into the cell through opening 22.

While the baffle 14 has been shown as being cylindrical and depending from the underside of the body 10 into the hollow interior of the plug body, it will be understood that other appropriate baffle means may also be employed. For example, the plug body itself may be formed with integral baffle means extending in a predetermined pattern from the interior walls and comprising an integral part of the plug.

Plug P in FIGURES 1–4 is shown in modified form in FIGURES 5–7. As described previously, plug P in FIGURE 5 includes the illustration of lugs in the form of flanged sections 31 and 32 which are part of a continuous flange extending around the plug near its upper periphery. Particularly with reference to FIGURE 7, the plug also illustrates the outwardly flaring of upper walls 36 and 37 in the form of a horizontal shoulder 46 adapted to fit against the upwardly extending projection 30 of a filling well.

In FIGURE 6, a modified elongated body 33 is shown to illustrate projections 34 and 35 which are curved in a concave direction to approximate the shape of the upper walls 36 and 37 of the plug which are curved in a convex direction and shown in FIGURE 5 as being circular. With this arrangement, the plug is held in a relatively stable position by curved projections 34 and 35 without the need for restricting flanges. Since projections 34 and 35 only approximate the shape of the adjoining wall sections 36 and 37, they provide a limited relative movement of the plug with respect to the body 33. This enables each plug position to be adjusted with respect to the opening of the filling well and insures a tight fit of the plug in the filling well.

In FIGURE 6, recess 38 provides a means for permitting egress of gases from the interior of the vent plug to the elongated body 33 and thus to the atmosphere. In the event that the plug does not contain baffles, then body 33 will contain baffles shown as cylindrical shapes 39, 40 and 41. These baffles effectively restrict acid from passing out of the plug without unduly restricting the gas passages or the usable volume of the plug.

FIGURE 7 illustrates the arrangement between the plug and elongated body 33. As shown, flanged sections 31 and 32 of the plug fit in the recesses formed by projections 34 and 35 of body 33. Baffle 39 serves to restrict the passage of acid entering the plug by entry hole 47.

Advantageously, body 33 is a unitary molded one-piece body with integral baffles 39–41. When increased strength is desired, then body 33 may include additional structural elements shown in FIGURE 6 as flanges 42, 43 and 44 which extend across the recess between projection 45 and the underside of body 33.

Assembly of the modified plug P to body 33 is carried out in a similar manner to the assembly described with reference to the plug of FIGURES 1–4. However, in FIGURES 5–7, plug P includes a significant advantage in that it does not require a particular alignment with respect to body 33 before being inserted into the body. The plug has a circular flange around its upper periphery which avoids the necessity of alignment described with reference to FIGURES 1–4. This modification is particularly important for automatic insertion of plugs in bodies in a mass production operation.

The component parts of the multiple plug assembly may be molded from a variety of plastic materials, such as polyethylene, polystyrene or the like. As indicated, it is preferable that the plastic material have some slight degree of resiliency or be capable of being deformed to a small extent without cracking, in order to enable the lugs of the plug P to be installed in the recesses of the body in the manner described.

As a result of the design of the aforementioned structure, any number of vent plugs can be combined in a single assembly. Preferably for an ordinary twelve volt battery containing six cells, two such assemblies would be provided having three vent plugs each suspended from a single supporting body. With such an arrangement it can be seen that an attendant servicing a battery would only be required to make two plug removals in order to service all six cells.

The above described assembly comprises components which can be readily manufactured from a variety of materials and readily assembled, thereby affording an inexpensive but enhanced battery part.

Having described the invention and certain exemplary embodiments thereof, the same is only intended to be limited by the scope of the following claims.

I claim:

1. A multiple vent plug assembly for electrical storage battery filling wells comprising a one-piece, elongated plastic body provided with a plurality of inwardly extending projections which form pairs of opposing recesses spaced at predetermined intervals along the longitudinal axis at the underside of said body, a plurality of hollow vent plugs having laterally projecting lugs extending into said recesses, said plugs being suspended from said body by means of said lugs, and means for permitting egress of gases from battery cells to the atmosphere through said vent plugs.

2. A vent plug assembly as described in claim 1 wherein said vent plugs are suspended from said body such that limited relative movement of said plugs with respect to said body is permitted.

3. A vent plug assembly as described in claim 1 wherein said vent plugs have upper walls curved in a convex direction, said laterally projecting lugs of said plugs are flange-shaped sections which fit into said recesses, and said projections are curved in a concave direction to approximate the shape of the upper walls of the vent plugs so as to provide a limited relative movement of said plugs with respect to said body which enables the plug to be accurately positioned in applicable filling well and insures a tight fit of each plug in its filling well.

4. A vent plug assembly as described in claim 1 wherein said lugs are rectangularly shaped and said projections are flanged to form recesses for said rectangular lugs.

5. A vent plug assembly as described in claim 1 wherein a cylindrical baffle extends downwardly from said elongated body into the hollow vent plug; said baffle permitting passage of battery cell gases through said plug while offering obstruction to the passage of electrolyte discharged into said plug.

6. A vent plug assembly as described in claim 1 wherein the means for permitting egress of said gases from a battery cell to the atmosphere includes a longitudinal recess disposed in the underside of the body and extending across the upper periphery of the plug.

7. A vent plug assembly as described in claim 1 wherein said projections are interconnected by additional projections which are flanged across their respective recesses to increase the strength of the body.

References Cited by the Examiner
UNITED STATES PATENTS

| 3,081,373 | 3/1963 | Hughes | 136—177 |
| 3,161,548 | 12/1964 | Goldingay | 136—170 X |

FOREIGN PATENTS

| 836,944 | 6/1960 | Great Britain. |
| 369,177 | 6/1963 | Switzerland. |

WINSTON A. DOUGLASS, *Primary Examiner.*

D. L. WALTON, *Assistant Examiner.*